United States Patent [19]

Palmer et al.

[11] 4,335,301

[45] Jun. 15, 1982

[54] WAVE SHAPING CIRCUIT FOR ELECTRO-OPTICAL CODE READERS

[75] Inventors: Roger C. Palmer; William J. Purdue, both of Edmonds, Wash.

[73] Assignee: Interface Mechanisms, Inc., Lynnwood, Wash.

[21] Appl. No.: 79,326

[22] Filed: Sep. 27, 1979

[51] Int. Cl.³ .............................................. G06K 7/10
[52] U.S. Cl. .................................. 235/462; 250/555; 307/268
[58] Field of Search .............. 307/266, 268, 269, 311; 235/462, 463; 250/568, 569; 328/147; 250/555; 340/146.3 AG

[56] References Cited

U.S. PATENT DOCUMENTS

| | | | |
|---|---|---|---|
| 3,751,636 | 8/1973 | Coles, Jr. ............................ | 250/555 |
| 3,752,963 | 8/1973 | Herrin ................................. | 250/555 |
| 3,784,794 | 1/1974 | Allais .................................. | 250/568 |
| 3,892,974 | 7/1975 | Ellefson et al. .................... | 250/568 |
| 3,909,594 | 9/1975 | Allais et al. ........................ | 235/462 |
| 3,949,233 | 4/1976 | Gluck ................................. | 250/555 |
| 3,991,299 | 11/1976 | Chadima, Jr. et al. ............ | 235/463 |
| 4,140,271 | 2/1979 | Nojiri et al. ....................... | 235/463 |

Primary Examiner—Donald J. Yusko
Attorney, Agent, or Firm—Christensen, O'Connor, Johnson & Kindness

[57] ABSTRACT

An electrical output signal from an electro-optical code reader is amplified (U1) to develop a first signal which is applied to a positive peak detector (U2D1, C2) and a negative peak detector (U3, D2, C3). The positive peak detector provides a second signal whose voltage level follows that of the first signal as the first signal increases, from the time that the voltage level of the second signal is brought substantially equal to that of the first signal to the time that the first signal begins to decrease, with the voltage level of the second signal thereafter being maintained substantially constant. The negative peak detector provides a third signal whose voltage level follows that of the first signal as the first signal decreases from the time that the voltage level of the third signal is brought substantially equal to that of the first signal to the time that the first signal begins to increase, with the third signal thereafter being maintained substantially constant. The second and third signals are combined (R5,R6) top provide a reference signal whose voltage level is intermediate those of the second and third signals. A comparator (U4) provides a circuit output signal which has a first logic level when the voltage level of the first signal exceeds that of the reference signal and which has a second logic level when the voltage level of the reference signal exceeds that of the first signal. The logic level transitions in the circuit output signal are detected (C4, R10, D6, R11; U5, C5, R9, D7, R 8) to develop pulses which momentarily close fast-acting semiconductor switches (S1, S2) associated with the positive and negative peak detectors, whereby the voltage level of the second signal is brought to that of the first signal at the time that the voltage level of the first signal goes above that of the reference signal, and whereby the voltage level of the third signal is brought to that of the first signal at the time that the voltage level of the first signal goes below that of the reference signal.

34 Claims, 7 Drawing Figures

WAVE SHAPING CIRCUIT FOR ELECTRO-OPTICAL CODE READERS

FIELD OF THE INVENTION

This invention generally relates to code reading devices, and more particularly, to a circuit for wave shaping the output signal of an electro-optical code reader.

BACKGROUND OF THE INVENTION

Electro-optical code readers are known to the prior art for scanning a coded record and for providing an electrical output signal representative of encoded data contained in the record. Each character of the encoded data (e.g., an alpha-numeric character) is represented by a predetermined number of sequential binary bits. One form of code typically used is the bar code which comprises a sequential series of alternating bars and spaces printed on a surface. In one type of bar code, each bit is represented by a single bar or space, with the width of each bar and space denoting the binary value of its corresponding bit.

The reader may comprise a hand-held housing, containing a light source and a light detector, which is manually scanned across the coded record. Examples of such readers are seen in U.S. Pat. No. 3,784,794 issued Oct. 10, 1972, Allais and U.S. Pat. No. 3,892,974 issued July 1, 1975, Ellefson et al., both assigned to the assignee of the present invention. As the reader is scanned across the coded record, it provides an electrical output signal which has a voltage level dependent upon the amount of light reflected by the particular portion of the coded record being scanned. Therefore, a space will result in a first or "positive" voltage level of the electrical output signal, while a bar will result in a second or "negative" voltage level of the electrical output signal, with the two voltage levels being interconnected by relatively fast voltage transitions at the approximate location of the transitions from a bar to a space, and vice versa. Essentially, the electrical output signal appears as an irregular sine wave alternating between first and second, peak voltage levels.

In order to decode the encoded data, it is necessary to supply the electrical output signal from the reader to a digital code recognition apparatus. The electrical output signal must, however, first be shaped into a square wave having predetermined first and second logic levels for each space and bar, with the transitions between such predetermined logic levels corresponding in time as nearly as possible to the transitions in time between bars and spaces in the coded record as the coded record is scanned so that the binary values of the bits in the encoded data are not lost or distorted.

It is particularly difficult to accurately detect the transitions between bars and spaces in the electrical output signal, inasmuch as the peak voltage levels in the electrical output signal and the slope of the transitions between such peak voltage levels may vary as the coded record is scanned, depending upon a number of factors, including the level of ambient light, the angle at which the reader is held with respect to the coded record during scanning, and errors in printing of the coded record, or dirt on the coded record, which result in the change in the "whiteness" of the spaces or a change in the "darkness" of the bars.

In the past, such wave shaping has been accomplished by comparing the instantaneous voltage level of an input signal proportional to the electrical output signal with a predetermined reference voltage. As long as the voltage level of the input signal is above the predetermined reference voltage, the wave shaping circuit provides an output signal having a first logic level, and, as long as the voltage level of the input signal is below the predetermined reference voltage, the wave shaping circuit provides an output signal having a second, distinct logic level. If the value of the reference voltage is fixed, then the wave shaping circuit may not respond to certain bars and spaces in the coded record which result in peak voltage levels of the input signal not sufficiently great with respect to the reference voltage so as to provide a change in the logic level of the output from the wave shaping circuit. To overcome this problem of variation in peak voltage levels and to accordingly provide a wave shaping circuit which is relatively amplitude-insensitive. U.S. Pat. No. 3,909,594, issued Sept. 30, 1975, Allais et al. and assigned to the assignee of the present invention, teaches a circuit for establishing a variable reference voltage whose level "tracks" the peak voltage levels in the input signal so as to be always approximately midway between the last positive and negative excursions thereof.

The circuit in U.S. Pat. No. 3,909,594 includes first and second peak detectors, the first peak detector following the positive excursions of the input signal and the second peak detector following the negative excursions of the input signal. The outputs of the first and second peak detectors are fed to a resistive summing network to generate the variable reference voltage. The output of the first peak detector is generally at the level of successive positive peaks, and the output of the second peak detector is generally at the level of successive negative peaks. Intermediate the successive positive and successive negative peaks, the respective outputs of the first and second peak detectors are discharged through appropriate resistors. In practice, it has been found that the discharge time of each peak detector had to be short enough so that the peak detector could respond to closely-following, relatively low amplitude peaks, and had to be long enough so that the peak detector had not completely discharged by the time voltage level of the input signal went above or below that of the reference signal following any peak. By establishing certain constraints on the scanning speed of the coded record and on the code density of the coded record, the circuit in U.S. Pat. No. 3,909,594 will provide acceptable operation without significant code reading errors. However, if these constraints are violated (such as the case where the reader is scanned very quickly or very slowly across the record), code reading errors will result.

It is therefore an object of this invention to provide an improved wave shaping circuit for electro-optical code readers.

It is another object of this invention to provide such an improved wave shaping circuit which is relatively insensitive to amplitude variations in an electrical output signal from the reader.

It is yet another object of this invention to provide such an improved wave shaping circuit which is relatively insensitive to the speed at which the reader is scanned across a coded record.

SUMMARY OF THE INVENTION

Briefly, these objects and others that will be recognized by those of ordinary skill in the art are achieved in a wave shaping circuit for producing a circuit output signal, which alternates between first and second logic levels, from a code reader electrical output signal whose voltage alternates in a substantially sinusoidal manner between positive and negative peak levels as the coded record is scanned by the code reader. A first means is responsive to the code reader electrical output signal for providing a first signal whose voltage is related to that of the code reader electrical output signal. A positive peak detector is responsive to the first signal to provide a second signal, the positive peak detector being operative to cause the voltage level of the second signal to follow that of the first signal, as the voltage level of the first signal increases from the time that the voltage level of the second signal is brought substantially equal to that of the first signal to the time that the voltage level of the first signal begins to decrease, and to thereafter maintain the voltage level of the second signal substantially constant. A negative peak detector is responsive to the first signal for providing a third signal, the negative peak detector being operative to cause the voltage level of the third signal to follow that of the first signal, as the voltage level of the first signal decreases from the time that the voltage level of the third signal is brought substantially equal to that of the first signal to the time that the voltage level of the first signal begins to increase, and to thereafter maintain the voltage level of the third signal substantially constant.

A second means combines the second and third signals to provide a reference signal whose voltage level is between those of the second and third signals. A third means provides the circuit output signal in response to a comparison of the voltage levels of the first and the reference signals, the circuit output signal having a first logic level when the voltage level of the first signal exceeds that of the reference signal and having the second logic level when the voltage level of the reference signal exceeds that of the first signal. A fourth means is provided for bringing the voltage level of the second signal substantially to that of the first signal at the time that the voltage level of the first signal goes above that of the reference signal, and for bringing the voltage level of the third signal substantially to that of the first signal at the time that the voltage level of the first signal goes below that of the reference signal.

In a preferred embodiment, the positive and negative peak detectors respectively include first and second capacitances for storing the second and third signals. The fourth means includes first and second, fast-acting semiconductor switches, and first and second differentiating networks respectively responsive to oppositely-going logic level transitions of the circuit output signal for momentarily closing the first and second semiconductor switches to couple the first and second capacitances to the first signal.

BRIEF DESCRIPTION OF THE DRAWINGS

The invention can best be understood by reference to the following portion of the specification, taken in conjunction with the accompanying drawings, in which:

FIG. 1 is a combined schematic and block diagram of a first embodiment of the wave shaping circuit of the present invention;

DESCRIPTION OF A PREFERRED EMBODIMENT

Figures 1, 4:
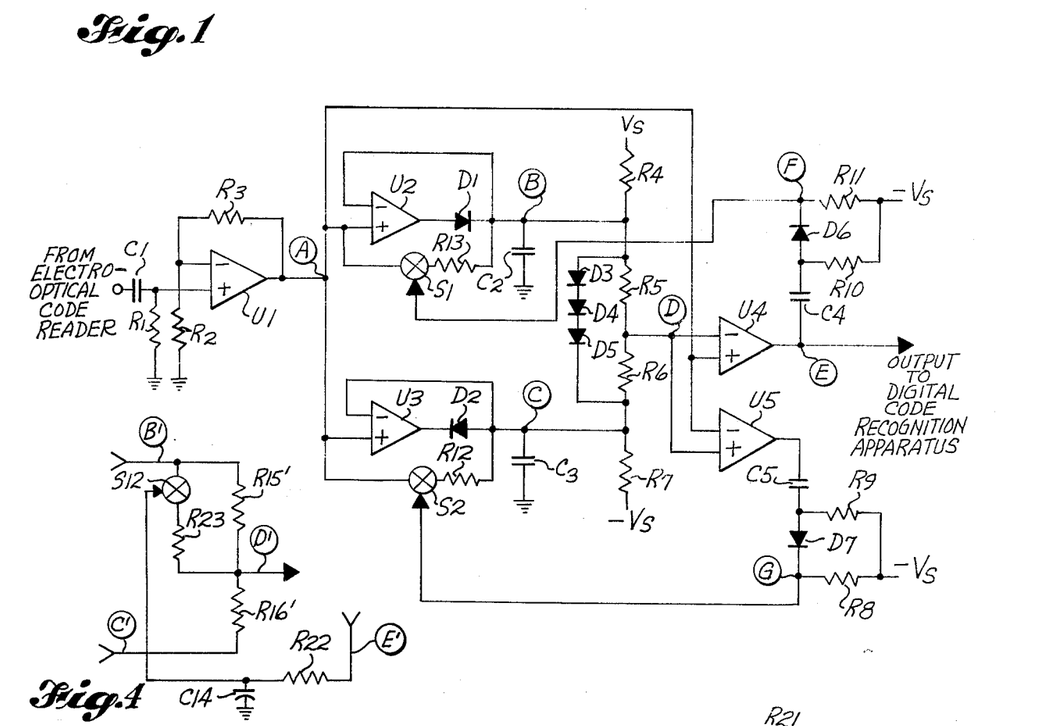

Referring now to FIG. 1, the electrical output signal from the electro-optical code reader is AC-coupled by a capacitor C1 to the noninverting input of an operational amplifier U1, with a resistor R1 being connected from the noninverting input of operational amplifier U1 to ground potential. The output of operational amplifier U1, or, circuit point A, is coupled to the inverting input of operational amplifier U1 by a resistor R3, and a resistor R2 couples the inverting input of operational amplifier U1 to ground potential. It will be appreciated that the circuit thus-described provides a signal at circuit point A which is an amplified version of the electrical output signal from the reader, as illustrated by the solid curve in FIG. 2(a), with the amount of amplification being determined by the values of the resistors R2 and R3.

This amplified or first signal is coupled to the noninverting inputs of operational amplifiers U2, U3, and U4, and to the inverting input of operational amplifier U5. The output of operational amplifier U2 is connected to the anode of a diode D1 whose cathode is connected to a circuit point B. Likewise, the output of operational amplifier U3 is connected to the cathode of a diode D2 whose anode is connected to a circuit point C. Circuit points B and C are connected directly to the inverting inputs of operational amplifiers of U2 and U3, respectively, and to the noninverting inputs of operational amplifiers of U2 and U3 through the respective series connections of resistor R13 and semiconductor switch S1 and of resistor R12 and semiconductor switch S2. As an example, each of switches S1, S2 may comprise any commercially-available, fast-acting semiconductor switch such as a CMOS transmission gate or a FET switch. As also can be noted from FIG. 1, capacitors C2 and C3 are connected from circuit points B and C, respectively, to ground potential.

Operational amplifier U2, diode D1, capacitor C2, and their associated interconnections, function as a positive peak detector, whereby the voltage across capacitor C2 and therefore present at circuit B is representative of the highest voltage level of the first signal at point A, neglecting the effect of the switch S1 and of the impedance of the portion of the circuit to be described that is connected to circuit point B. The signal at circuit point B, or the second signal, is represented by the dashed curve in FIG. 2(a). Likewise, operational amplifier U3, diode D2, capacitor C3, and their associated interconnections, function as a negative peak detector, whereby the voltage across capacitor C3 and therefore present at circuit point C is representative of the lowest voltage level of the first signal at circuit point A, neglecting the effect of switch S2 and of the impedance of the portion of the circuit to be described that is connected to circuit point C. The signal at circuit point C, or the third signal, is represented by the dot-dash curve in FIG. 2(a).

A resistive network, including series-connected resistors R4, R5, R6 and R7, is connected between a source of a positive supply potential $V_S$ and a source of a negative supply potential $-V_S$. The common junction of resistors R4 and R5 is connected to circuit point B, and the common junction of resistors R6 and R7 is connected to circuit point C. A clamping diode network, including series-connected diodes D3, D4 and D5, is connected between circuit points B and C, with the diode network being poled to conduct from circuit point B to circuit point C.

Neglecting the effect of resistors R4 and R7, and of diodes D3, D4 and D5, resistors R5 and R6 effect summation of the second and third signals present on circuit points B, C so as to produce at their common junction, or circuit point D, a variable reference signal whose voltage level is between the voltage levels of the second and third signals at circuit points B, C. Resistors R5 and R6 may be equal-valued, so that the voltage level of the reference signal at circuit point D is midway between the voltage levels of the second and third signals. Preferably, the value of resistor R5 is somewhat greater than the value of resistor R6 so that the voltage level of the reference signal is closer to that of the third signal at circuit point C than to that of the second signal at circuit point B, for reasons to be discussed hereinafter. The reference signal at circuit point D is represented by the dotted curve in FIG. 2(a).

Figure 2A:
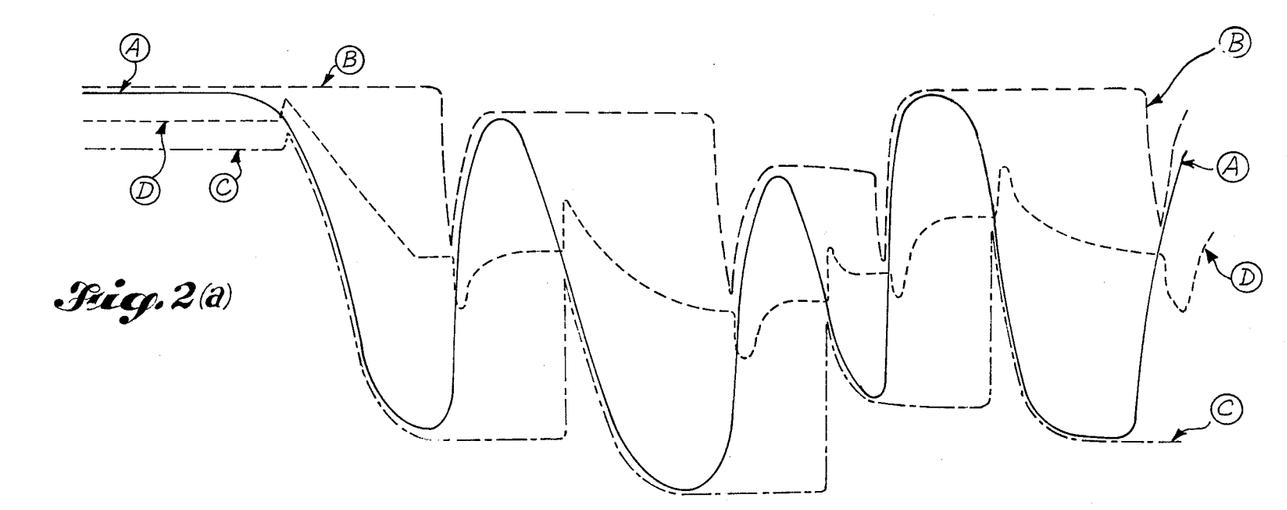
FIGS. 2(a), 2(b), 2(c) and 2(d) are wave form diagrams illustrating the operation of the circuit of FIG. 1.
Figure 2B:
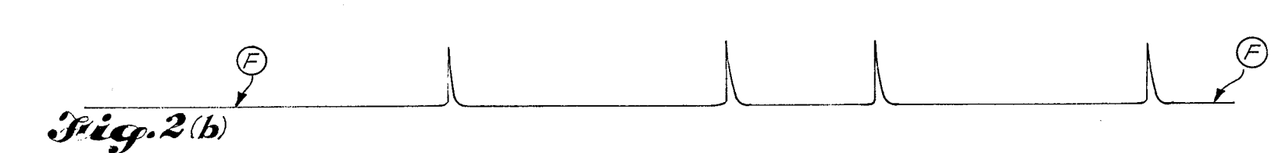
Figure 2C:
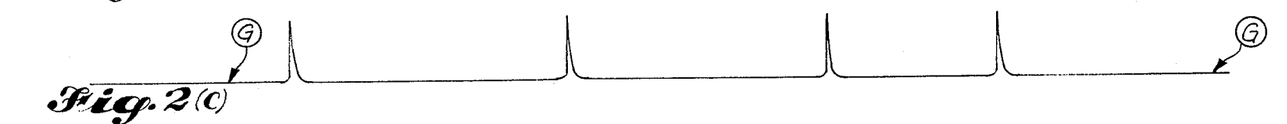
Figure 2D:
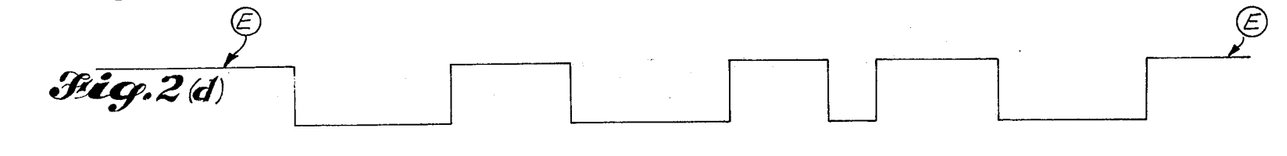

Circuit point D is coupled to the inverting input of operational amplifier U4 and to the noninverting input of operational amplifier U5. Operational amplifiers U4 and U5 are configured in a conventional manner as comparators, whereby the signal on the output of each operational amplifier has a high logic level when the voltage level of a signal at the noninverting input thereof exceeds that of a signal at the inverting input thereof, and whereby the signal on the output has a low logic level when the voltage level of a signal at the inverting input thereof exceeds that of a signal at the noninverting input thereof. The output from operational amplifier U4, or circuit point E, comprises the output from the wave shaping circuit and is illustrated in FIG. 2(d).

In one typical application, the coded record includes alternating "dark" bars and "white" spaces printed on a "white" surface (the terms "white" and "dark" being used to denote relative, rather than absolute surface reflectivities). As the reader is scanned across such a coded record, the electrical output signal therefrom, and thus the first signal at circuit point A, will have a substantially sinusoidal wave form as illustrated in FIG. 2(a), including an initial or positive voltage level corresponding to the area surrounding the coded record, followed by alternating second or negative and first or positive peak voltage levels corresponding to the alternating bars and spaces of the coded record. It will be noted that the actual positive and negative peak voltage levels differ from space to space and from bar to bar as the record is scanned, due to differing surface reflectivities. During a transition between areas of significantly differing reflectivities (e.g. from a space to a bar), the wave form has a finite slope because the reader cannot instantaneously respond to such a transition. Also, the separation between the positive-going and the negative-going slopes of the wave form vary, depending upon the width of each bar or space and the speed at which that bar or space is scanned.

When the reader is brought into contact with the "white" area surrounding the coded record and is moved toward the coded record, the first signal at circuit point A is at the initial, positive level. The voltage level of the reference signal at circuit point D is maintained below the expected initial, positive level of the first signal. Accordingly, the output of operational amplifier U4 is at its high logic level, as illustrated in FIG. 2(d). As the reader passes on to the first bar of the coded record, the voltage level of the first signal A begins to decrease. When the voltage level of the first signal A goes below that of the reference signal, operational amplifier U4 switches its output to its low logic level, as illustrated in FIG. 2(d).

As scanning of the coded record continues, the first signal continues to decrease toward its second, negative peak level which is reached, in normal operation, at a point on the coded record just before the reader passes on to the adjacent space. As the bar-space transition is made by the reader, the first signal begins to increase. With continued scanning, the voltage level of the first signal becomes greater than the voltage level of the reference signal, whereupon operational amplifier U4 switches its output back to the high logic level. As illustrated in FIG. 2(d), the output of comparator U4 at circuit point E alternately switches between its high and second low levels as the entire coded record is scanned, and thereby providing a square-wave representation of the bar code.

Returning now to FIG. 1, the output of operational amplifier U4 is coupled by a capacitor C4 to the anode of a diode D6 whose cathode is connected to a circuit point F, and the output of operational amplifier U5 is coupled by a capacitor C5 to the anode of a diode D7 whose cathode is connected to a circuit point G. Resistors R10 and R9 are connected from the source of negative supply potential $-V_S$ to the common junctions of capacitor C4 and diode D6, and of capacitor C5 and diode D7, respectively, and resistors R11 and R9 are connected from $-V_S$ to circuit points F and G, respectively. Circuit points F and G are coupled, respectively, to the control inputs of semiconductor switches S1 and S2.

Normally, semiconductor switches S1, S2 are maintained nonconductive by a negative potential applied to the control inputs thereof from the source of negative supply potential $-V_S$ through resistors R11, R9. Capacitor C4, diode D6 and resistor R10, and capacitor C5, diode D7 and resistor R9, comprise first and second differentiating networks which function to apply a short, positive pulse to control inputs of respective semiconductor switches S1 and S2 when the outputs of respective operational amplifiers U4 and U5 switch from their low logic level to their high logic level, whereby semiconductor switches S1 and S2 are placed in a conducting condition for the duration of each positive pulse. Accordingly, when semiconductor switches S1 and S2 are momentarily energized, they provide a low-resistance conducting path between circuit point A and circuit points B and C, respecitvely, through respective resistors R13, R12 which are equal-valued and which function to swamp out any resistance variations between switches S1 and S2.

Reference should now be made to FIGS. 1 and 2(a), 2(b), 2(c) and 2(d) in conjunction with the following detailed description of the operation of the circuit. The values of resistors R4 and R7 are chosen so that the voltage level of the reference signal at circuit point D is less than the initial, positive level of the first signal at circuit point A when the reader is brought into contact with and moved across the "white" area surrounding the coded record. Preferably, the voltage level of the second signal at circuit point B is greater than the initial, positive level of the first signal, and the voltage level of the third signal at circuit point C is less than the initial, positive level of the first signal. Accordingly, as the reader is scanned across the "white" area, the outputs of operational amplifiers U2 and U3 are negative and positive, respectively, thereby reverse-biasing diodes D1 and D2 so that the voltage levels of the second and third signal, and therefore the reference signal, remain substantially constant. The output of operational amplifier U4 at circuit point E is at the high logic level, and the output of operational amplifier U5 is at the low logic level. Further, semiconductor switches S1, S2 are nonconductive.

As the reader passes on to the first bar of the coded record, the first signal at circuit point A begins to decrease. When the voltage level of the first signal goes below that of the reference signal at circuit point D, operational amplifiers U4 and U5 switch their outputs to the low and high logic levels, respectively. As a result, a short positive pulse is produced at circuit point G (but not at circuit point F since diode D6 is reverse-biased), which short positive pulse places semiconductor switch S2 into a momentary conducting condition whereby the voltage level of the third signal at circuit point C is brought up to that of the first signal. As a result, the voltage level of the reference signal at circuit point D is also pulled up by a proportionate amount.

As the first signal at circuit point A continues to decrease, the short positive pulse at circuit point G terminates so that semiconductor switch S2 becomes nonconductive. At this time, the output of operational amplifier U3 is zero, so that diode D2 becomes forward-biased. As the first signal thereafter decreases, the second peak detector functions to maintain the voltage level of the third signal at circuit point C substantially equal to that of the first signal, with the voltage level on the output of operational amplifier U3 being lower than that of the third signal at circuit point C by the forward conduction voltage of diode D2.

It will be noted that the voltage level of the second signal at circuit point B remains substantially constant during the time that the first signal at circuit point A is decreasing. However, the voltage level of the third signal at circuit point C follows that of the first signal, so that the voltage level of the reference signal at circuit point D also decreases.

As the first signal at circuit point A reaches its negative peak level and thereafter begins to increase when the reader passes from the first bar onto the adjacent space, diode D2 becomes reverse-biased and the voltage level of the third signal at circuit point C is maintained at substantially the negative peak level by capacitor C3. Accordingly, the reference signal at circuit point D remains at a substantially constant voltage level.

When the voltage level of the first signal thereafter exceeds that of the reference signal, operational amplifiers U4 and U5 switch their outputs to the high and low logic levels, respectively. As a result, a short positive pulse is provided at circuit point F (but not at circuit point G since diode D7 is reverse-biased), which short positive pulse places semiconductor switch S1 into a momentary conducting condition whereby the voltage level of the second signal at circuit point B is brought down to that of the first signal. As a result, the voltage level of the reference signal at circuit point D is also pulled down by a proportionate amount. Upon termination of the positive pulse at circuit point F, semiconductor switch S1 returns to its nonconducting condition. Diode D1 is now forward-biased, however, so that the voltage level of the second signal at circuit point B follows and increases with that of the first signal at circuit point A. Accordingly, the voltage level of the reference signal at circuit point D also increases.

As the first signal at circuit point A reaches its positive peak level and thereafter begins to decrease upon the reader passing from the space to the adjacent bar, diode D1 becomes reverse-biased so that the voltage level of the second signal at circuit point B is maintained at the first peak level by capacitor C2. Accordingly, the voltage level of the reference signal at circuit point D is maintained substantially constant.

When the voltage level of the first signal goes below that of the reference signal at circuit point D, comparators U4 and U5 again switch their outputs, a short positive pulse is produced at circuit point G, semiconductor switch S2 is placed into a momentary conducting condition, the voltage level of the third signal at circuit point C is brought up to that of the first signal and the voltage level of the reference signal is likewise increased. Thereafter, the operation of the circuit proceeds identically as described for the remaining bars and spaces of the coded record.

It will be seen that the circuit constantly adjusts the voltage level of the reference signal so as to be approximately intermediate the last-occurring set of positive and negative peak levels of the first signal and thus of the electrical output signal from the reader. As a result, the circuit is relatively insensitive to variations in the actual voltage levels of the electrical output signal. It will also be seen that the circuit is relatively insensitive to the speed at which the reader is scanned across the coded record, inasmuch as the voltages across capacitors C2 and C3 (the second and third signals) are very quickly brought to the voltage level of the first signal at the time a transition from a space to a bar and from a bar to a space is detected by operational amplifier U4 (and operational amplifier U5). As a result, the square wave output at circuit point E is a faithful reproduction of the width of the bars and spaces in the coded record.

In certain applications, the separation between the positive and negative peak levels of the first signal at circuit point A may be relatively large. Diodes D3, D4 and D5 accordingly may be used in such applications to limit the separation between the voltage levels of the second and third signals at circuit points B and C to the total forward conduction voltages of those diodes, so as to insure that the reference signal at circuit point D is always approximately intermediate the successive positive and negative peak levels of the first signal at circuit point A. As an example, let it be assumed that successive positive and negative peak levels of the first signal have been relatively constant, that the next positive peak level encountered during scanning of the coded record has a substantially increased value, and that the succeeding negative peak level is substantially equal to the preceding negative peak levels. If the diode network including diodes D3, D4 and D5 were not included, the first signal would cross the level of the reference signal at a point on the negative-going slope of the first signal following the increased, positive peak level that is closer to the succeeding negative peak level than to the increased positive peak level. In the example under consideration, the diode network including diodes D3, D4 and D5 pulls up the voltage level of the third signal at circuit point C when the separation between the voltage levels of the second and third signals exceeds the total forward conduction voltage of the diode network. As a result, the voltage level of the reference signal is also pulled up so as to be more nearly midway the increased, positive peak level and the succeeding negative peak level. Preferably, the total forward conduction voltage of the diode network approximates the expected normal separation between the positive and negative peak levels of the first signal (e.g., 1.8 volts).

In a working version of a circuit constructed as illustrated in FIG. 1, in which $V_S$ had a nominal value of +5 VDC and $-V_S$ had a nominal value of $-5$ VDC, the components, types and/or values listed hereinafter were utilized:

| Component | Component Type and/or Value |
|---|---|
| R1 | 100 kilohms |
| R2 | 1 kilohm |
| R3 | 20 kilohms |
| R4 | 1 megohm |
| R5 | 100 kilohms |
| R6 | 100 kilohms |
| R7 | 820 kilohms |
| R8 | 100 kilohms |
| R9 | 27 kilohms |
| R10 | 27 kilohms |
| R11 | 100 kilohms |
| R12 | 1 kilohm |
| R13 | 1 kilohm |
| C1 | 5 microfarads |
| C2 | .033 microfarad |
| C3 | .033 microfarad |
| C4 | .001 microfarad |
| C5 | .001 microfarad |
| D1 | 1N4148 |
| D2 | 1N4148 |
| D3 | 1N4148 |
| D4 | 1N4148 |
| D5 | 1N4148 |
| D6 | 1N4148 |
| D7 | 1N4148 |
| U1 | 741 op. amp. |
| U2 | 741 op. amp. |
| U3 | 741 op. amp. |
| U4 | 741 op. amp. |
| U5 | 741 op. amp. |
| S1 | 4016 CMOS transmission gate |
| S2 | 4016 CMOS transmission gate |

Figure 3:
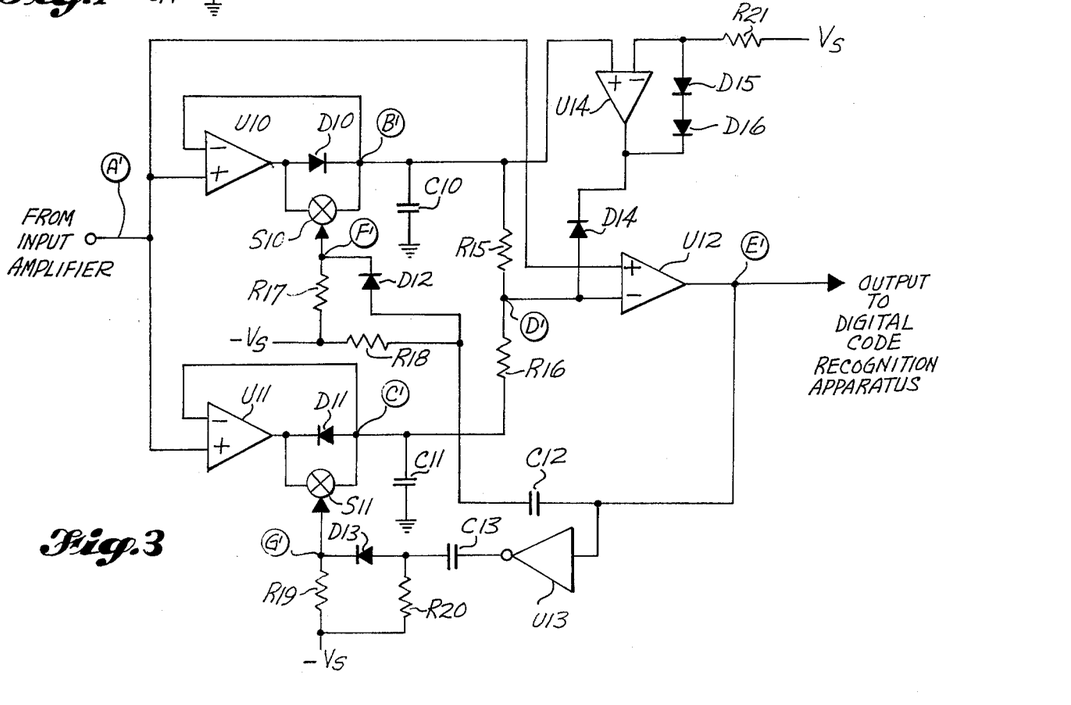
FIG. 3 is a combined schematic and block diagram of a second embodiment of the wave shaping circuit of the present invention; and, FIG. 4 is a combined schematic and block diagram of a modification of the embodiment in FIG. 3.

Referring now to FIG. 3, the embodiment of the invention illustrated therein is adapted to receive, at circuit point A', an amplified version of the electrical output signal from the reader (such as provided by operational amplifier U1 in FIG. 1). A first peak detector, comprising operational amplifier U10, diode D10 and capacitor C10, receives the first signal at circuit point A' and develops therefrom a second signal at circuit point B'. A second peak detector, comprising operational amplifier U11, diode D11 and capacitor C11, receives the first signal at circuit point A' and develops therefrom a third signal at circuit point C'. The second and third signals are combined by series-connected resistors R15, R16 to develop a reference signal at circuit point D'. An operational amplifier U12, configured as comparator, receives the reference signal at circuit point D' and the first signal at A' and develops therefrom an output signal at circuit point E'. A semiconductor switch S10 is connected across diode D10 in the first peak detector and a semiconductor switch S11 is connected across diode D11 in the second peak detector. As with the circuit of FIG. 1, a swamping resistor (not illustrated) may be connected in series with each of the semiconductor switches S10, S11. A first differentiating network, comprising capacitor C12, resistors R17 and R18, and diode D12, develops a positive pulse from each low logic level-high logic level transition in the output signal at circuit point E', with this positive pulse being applied to semiconductor switch S10 to place it into a momentary conducting condition. Likewise, a second differentiating network, comprising capacitor C13, resistors R19 and R20, and diode D13, receives the output signal at circuit point E' through an inverter U13, and develops a positive pulse from each high logic level/low logic level transition in the output signal at circuit point E' to place semiconductor switch S11 in a momentary conducting condition. An initial condition circuit includes an operational amplifier U14. The second signal at circuit point B' is coupled to the noninverting input of operational amplifier U14. A fixed level signal, obtained from a source of positive supply potential $V_S$ through a resistor R21, is coupled to the inverting input of operational amplifier U14, and a pair of seriesconnected diodes D15, D16 are poled to conduct from the inverting input of operational amplifier U14 to the output thereof. The anode of a diode D14 is connected to circuit point D', and the cathode thereof to the output of operational amplifier U14.

The operation of the circuit in FIG. 3 is generally similar to that of the circuit in FIG. 1. However, the following differences should be noted.

First, the initial value of the reference signal, e.g., the value before the time that the reader passes from the "white" area surrounding the coded record onto the coded record, is established not by resistors R4 and R7, as in FIG. 1, but rather by the initial condition circuit in FIG. 3 which functions to maintain the initial voltage level of the reference signal at circuit point D' below the initial voltage level of the first signal at circuit point A'. As the reader is scanned across the "white" area surrounding the coded record, diodes D10 and D11 will be forward-biased so that the voltage levels of the first and second signals at circuit points B', C' are accordingly equal to that of the first signal at circuit point A'. As the reader passes onto the first bar of the coded record, the first signal at circuit point A' begins to decrease. Accordingly, diode D10 becomes reverse-biased so that the voltage level of the second signal at circuit point B' thereafter remains substantially constant. Diode D11, however, remains forward-biased so that the voltage level of the third signal at circuit point C' decreases. Diodes D15 and D16, supply potential $V_S$ and resistor R21 cause the output of operational amplifier U14 to be maintained below that of the second signal by the total forward conduction voltage of diodes D15 and D16. Diode D14 serves to maintain the voltage level of the reference signal at circuit point D' above that of the output from operational amplifier U14 by the forward conduction voltage of diode D14. Accordingly, the voltage level of the reference signal is always maintained below the voltage level of the second signal by the forward conduction voltage of a single diode (e.g., the total forward conduction voltages of diodes D15 and D16 minus the forward conduction voltage of diode D14). As the reader therefore passes onto the first bar of the coded record, the voltage level of the reference signal is below the voltage levels of the first and second signals, so that the "white" area-bar transition can be detected by operational amplifier U12.

Second, the voltage levels of the second and third signals are brought to that of the first signal upon detection of a bar-space and a space-bar transition, respectively, not by a semiconductor switch shunting the operational amplifier and the diode of the peak detector, as in FIG. 1, but rather by semiconductor switches S10 and S11 shunting only the diodes D10 and D11 of the respective positive and negative peak detectors. As an example, momentary energization of semiconductor switch S10 causes diode D10 to be shunted, so that the output of operational amplifier U10 in the positive peak detector is connected directly through circuit point D' to the inverting input thereof. As a result, operational amplifier U10 functions as a unity gain amplifier, whereby the voltage level at circuit point B' is forced to the voltage level of the first signal at circuit point A'.

Third, the short positive pulse required to momentarily energize the semiconductor switch associated with the negative peak detector is developed by simply inverting, through inverter U13, the logic level transitions of the output of operational amplifier U12, rather than utilizing a separate operational amplifier U5 as in FIG. 1.

In a working version of a circuit constructed as illustrated in FIG. 3, in which $V_S$ had a nominal value of $+5$ VDC and $-V_S$ had a nominal value of $-5$ VDC, the components, types and/or values listed hereinafter were utilized:

| Component | Component Type and/or Value |
|---|---|
| R15 | 220 kilohms |
| R16 | 180 kilohms |
| R17 | 100 kilohms |
| R18 | 100 kilohms |
| R19 | 100 kilohms |
| R20 | 100 kilohms |
| R21 | 10 kilohms |
| C10 | .033 microfarad |
| C11 | .033 microfarad |
| C12 | .001 microfarad |
| C13 | .001 microfarad |
| D10 | 1N4148 |
| D11 | 1N4148 |
| D12 | 1N4148 |
| D13 | 1N4148 |
| D14 | 1N4148 |
| D15 | 1N4148 |
| D16 | 1N4148 |
| U10 | 741 op. amp. |
| U11 | 741 op. amp. |
| U12 | 741 op. amp. |
| U13 | 741 op. amp. |
| U14 | 741 op. amp. |
| S10 | 4016 CMOS transmission gate |
| S11 | 4016 CMOS transmission gate |

Under certain circumstances, the separation between the positive and negative peak levels of the first signal at circuit point A' may be significantly less than the normal separation between those peak levels, (e.g., 1.8 volts). These circumstances typically arise when a coded record of poor quality, in which the spaces thereof are "gray", is scanned by the reader. As a result, the positive peak levels of the first signal are lower than those normally encountered. In order to minimize code reading errors under such circumstances, the value of resistor R15 is somewhat greater than the value of resistor R16 so that the voltage level of reference signal is closer to that of the third signal at circuit point C' than to that of the second signal at circuit point B'. By so "biasing" the voltage level of the reference signal toward the negative peak levels, the voltage level of the first signal crosses the voltage level of the reference signal at points more nearly approximate to the actual bar-space transitions in the coded record. By considering the component values of resistors R15 and R16 given in the aforementioned tabulation for the circuit of FIG. 3, it will be seen that the voltage level of the reference signal is 45% of the separation between the voltage levels of the second and third signals, referenced to the voltage level of the third signal.

There are also a number of circumstances that may be encountered during the scanning of the coded record in which the circuits previously described cannot detect certain bar-space transitions. As an example, the density of the coded record may be such that the portion of the coded record illuminated by the light source in the code reader is appreciably larger than the narrowest bars or spaces in the coded record. More generally speaking, the resolution or frequency response of the code reader may be lower than the optimum values thereof for the particular coded record being scanned. As another example, a transparent sheet may be placed over the coded record which diffuses the light reflected back to the light detector in the code reader so as to reduce the amplitude of the electrical output signal therefrom.

In the foregoing circumstances, it has been found that the separation between successive positive and negative peak levels of the electrical output signal from the code reader obtained as narrow bars or spaces are scanned is much less than the peak-to-peak voltage separation obtained as wide bars or spaces are scanned. To illustrate, let it be assumed that: a wide bar, a wide space, and a narrow bar of a coded record are successively scanned by the reader; the voltage between the negative peak level of the first signal obtained during scanning of the wide bar and the succeeding positive peak level obtained during the scanning of the wide space is 1.8 volts; and, the voltage between the positive peak level obtained during scanning of the wide space and the succeeding negative peak level obtained during scanning of the narrow bar is 0.8 volts. It will be appreciated that the voltage level of the reference signal, at a time subsequent to the time of occurrence of the positive peak level obtained during scanning of the wide space, will be either 0.9 volts or 0.99 volts below that positive peak level (depending on whether the reference signal is 50% or 45% of the separation between the voltage levels of the second and third signals). Accordingly, the voltage level of the first signal obtained during scanning of the narrow bar will never go below that of the reference signal, so as to result in a code reading error. A similar error may occur, for example, upon the successive scanning of a wide space, a wide bar and a narrow space.

To eliminate these types of code reading errors, the circuit modification illustrated in FIG. 4 may be utilized. In particular, the circuit modification in FIG. 4 is designed to be utilized with the circuit of FIG. 3 and includes series-connected resistors R15', R16' which are substituted for series-connected resistors R15, R16 in FIG. 3. As such, circuit point B' is connected to one side of resistor R15', circuit point C' is connected to one side of resistor R16', and the common junction of resistors R15' and R16' is connected to circuit point D'. A resistor R22 is connected from circuit point E' to the control input of a semiconductor switch S12, and a capacitor C14 is connected from a common junction of resistor R22 and the control input of semiconductor switch S12 to ground potential. Semiconductor switch S12, which may comprise any commercially-available, fast-acting semiconductor switch such as a CMOS transmission gate or a FET switch, is in turn connected in series with a resistor R23, with the series connection of switch S12 and resistor R23 being connected in shunt with resistor R15'.

The values of resistors R15', R16' and R23 are chosen so that the voltage level of the reference signal at circuit point D' is closer to that of the third signal at circuit point C' when switch S12 is opened, and is closer to that of the second signal at circuit point B' when switch S12 is closed. As an example, the values of resistors R15', R16' and R23 may be, respectively, 270 kilohms, 180 kilohms, and 220 kilohms, whereby the voltage level of the reference signal at circuit point D', referenced to the voltage level of the third signal, is 40% of the separation between the voltage levels of the second and third signals when switch S12 is open, and is 60% of the separation between the voltage levels of second and third signals when switch S12 is closed. Switch S12 is open when the output signal from the wave-shaping circuit, at circuit point E', has a low logic level (representing the scanning of a bar), and is closed when the output signal from the wave-shaping circuit, at circuit E', has a high logic level (representing the scanning of a space). Resistor R22 and capacitor C14 function as a delay circuit, so that switch S12 is open or closed at a short time after each logic level transition in the output signal from the wave-shaping circuit.

Considering again the situation in which a wide bar, a wide space and a narrow bar are successively scanned, it will be seen that switch S12 is closed during scanning of the wide space at a time shortly after the voltage level of the first signal goes above that of the reference signal. Upon closure of switch S12, the voltage level of the reference signal at circuit point D' is brought closer to that of the second signal at circuit point B' than to that of the third signal at circuit point C'. As the first signal reaches the positive peak level obtained during scanning of the wide space, and thereafter decreases, the voltage level of the reference signal is 60% of the voltage separation between the second and third signals so that the reference signal is 0.72 volts below that of the second signal. Accordingly, when the first signal thereafter decreases to a voltage level of 0.8 volts below that of the second signal during scanning of the narrow bar, the voltage level of the first signal will cross that of the reference signal so as to allow detection of the space-bar transition.

In summary, the circuit modification in FIG. 4 provides a means that provides a positive bias to the voltage level of the reference signal during the scanning of each space of a coded record so as to allow the detection of the subsequent space-bar transition when scanning of the subsequent bar results in a relatively low-amplitude negative peak level, and provides a negative bias to the voltage level of the reference signal during the scanning of each bar so as to allow the detection of the subsequent bar-space transition when scanning of the subsequent space results in a relatively low-amplitude positive peak level.

While the invention has been described with respect to various embodiments, it is to be clearly understood by those skilled in the art that the invention is not limited thereto, but rather that the scope of the invention is to be interpreted only in conjunction with the appended claims.

The embodiments of the invention in which an exclusive property or privilege is claimed are:

1. A wave shaping circuit for producing a circuit output signal, which alternates between first and second logic levels, from a code reader electrical output signal whose voltage alternates in a substantially sinusoidal manner between positive and negative peak levels as a coded record is scanned by the code reader, said circuit comprising:

(A) first means responsive to the code reader electrical output signal for providing a first signal whose voltage is related to that of the code reader electrical output signal;

(B) a positive peak detector responsive to said first signal for providing a second signal, said positive peak detector being operative to cause the voltage level of said second signal to follow that of said first signal, as the voltage level of said first signal increases from the time that the voltage level of said second signal is brought substantially equal to that of said first signal to the time that the voltage level of said first signal begins to decrease, and being further operative to thereafter maintain the voltage level of said second signal substantially constant;

(C) a negative peak detector responsive to said first signal for providing a third signal, said negative peak detector being operative to cause the voltage level of said third signal to follow that of said first signal, as the voltage level of said first signal decreases from the time that the voltage level of said third signal is brought substantially equal to that of said first signal to the time that the voltage level of said first signal begins to increase, and being further operative to thereafter maintain the voltage level of said third signal substantially constant;

(D) second means combining said second and third signals to provide a reference signal whose voltage level is between those of said second and said third signals;

(E) third means for providing said circuit output signal in response to a comparison of the voltage levels of said first and said reference signals, said circuit output signal having said first logic level when the voltage level of said first signal exceeds that of said reference signal and having said second logic level when the voltage level of said reference signal exceeds that of said first signal; and, (F) fourth means for bringing the voltage level of said second signal substantially to that of said first signal at the time that the voltage level of said first signal goes above that of said reference signal, and for bringing the voltage level of said third signal substantially to that of said first signal at the time that the voltage level of said first signal goes below that of said reference signal.

2. A circuit as recited in claim 1, further comprising initial condition means establishing an initial voltage level of said reference signal at a time before the code reader is scanned across the coded record, said initial voltage level differing from an expected initial voltage level of said first signal and being such that the voltage level of said first signal crosses the initial voltage level of said reference signal as the code reader begins to scan the coded record.

3. A wave shaping circuit as recited in claim 2, wherein said initial condition means is operative to establish said initial voltage level of said reference signal below said expected initial voltage level of said first signal.

4. A wave shaping circuit as recited in claim 1, further comprising initial condition means operative to maintain the voltage level of said reference signal at least a predetermined amount below the voltage level of said first signal.

5. A wave shaping circuit as recited in claim 1, wherein said second means is operative to combine said second and third signals so that said voltage level of said reference signal is midway between those of said second and third signals.

6. A wave shaping circuit as recited in claim 1, wherein said second means is operative to combine said second and third signals so that said voltage level of said reference signal is closer to that of said third signal than to that of said second signal.

7. A wave shaping circuit as recited in claim 6, wherein the voltage level of said reference signal is 45% of the separation between the voltage levels of said second and third signals.

8. A wave shaping circuit as recited in claim 1, wherein said second means is operative to bias the voltage level of said reference signal toward that of said second signal when said circuit output signal has said first logic level and to bias the voltage level of said reference signal toward that of said third signal when said circuit output signal has said second logic level.

9. A wave shaping circuit as recited in claim 8, wherein the voltage level of said reference signal is 60% of the separation between the voltage levels of said second and third signals when said circuit output signal has said first logic level, and is 40% of the separation between the voltage levels of said second and third signals when said circuit output signal has said second logic level.

10. A wave shaping circuit as recited in claim 1, further comprising clamping means for limiting the separation between the voltage levels of said second and said third signals to a predetermined amount substantially equal to the expected normal separation between positive and negative peak levels of said first signal.

11. A wave shaping circuit as recited in claim 1, wherein said positive peak detector includes:
a first operational amplifier having inverting and noninverting inputs and an output; a first capacitance; a first unidirectional conducting means coupling the output of said first operational amplifier to said first capacitance, said first unidirectional conducting means being poled to conduct from the output of said first operational amplifier to said first capacitance; means coupling said first capacitance to the inverting input of said first operational amplifier; and, means applying said first signal to the noninverting of said first operational amplifier, whereby said second signal appears across said first capacitance;
and, wherein said second peak detector includes:
a second operational amplifier having inverting and noninverting inputs and an output; a second capacitance; a second unidirectional conducting means coupling the output of said second operational amplifier to said second capacitance, said second unidirectional conducting means being poled to conduct from said second capacitance to the output of said second operational amplifier; means coupling said second capacitance to the inverting input of said second operational amplifier; and, means applying said first signal to the noninverting input of said second operational amplifier, whereby said third signal appears across said second capacitance.

12. A wave shaping circuit as recited in claim 11, wherein said fourth means includes:

a first fast-acting semiconductor switch connected in shunt with said first operational amplifier and said first unidirectional conducting means between the noninverting input of said first operational amplifier and said first capacitance; and, a second fast-acting semiconductor switch connected in shunt with said second operational amplifier and said second unidirectional conducting means between the noninverting input of said second operational amplifier and said second capacitance.

13. A wave shaping circuit as recited in claim 11, wherein said fourth means includes:
a first fast-acting semiconductor switch connected in shunt with said first unidirectional conducting means between the output of said first operational amplifier and said first capacitance; and, a second fast-acting semiconductor switch connected in shunt with said second unidirectional conducting means between the output of said second operational amplifier and said second capacitance.

14. A wave shaping circuit as recited in claims 12 or 13, wherein said first and said second fast-acting semiconductor switches each comprise a CMOS transmission gate.

15. A wave shaping circuit as recited in claims 12 or 13, wherein said first and said second fast-acting semiconductor switches each comprise a field-effect transistor.

16. A wave shaping circuit as recited in claims 11, 12, or 13, wherein said first and said second unidirectional conducting means each comprise a diode.

17. A wave shaping circuit as recited in claim 11, wherein said second means includes:
a first resistance coupling said first capacitance to a common circuit point; and, a second resistance coupling said second capacitance to said common circuit point, whereby said reference signal appears at said common circuit point.

18. A wave shaping circuit as recited in claim 17, wherein said first and second resistances are substantially equal-valued, whereby the voltage level of said reference signal is substantially midway between the voltage levels of said second and said third signals.

19. A wave shaping circuit as recited in claim 17, wherein said first resistance is slightly greater in value than said second resistance, whereby the voltage level of said reference signal is biased toward that of said third signal.

20. A wave shaping circuit as recited in claim 17, wherein said second means further includes: a series circuit consisting of a third resistance and a switch means, said series circuit being connected in shunt with one of said first and second resistances; and, means actuating and deactuating said switch means in response to said circuit output signal, with the values of said first, second and third resistances being such that the voltage level of said reference signal is biased toward that of said second signal when said circuit output signal has said first logic level and is biased toward that of said third signal when said circuit output signal has said second logic level.

21. A wave shaping circuit as recited in claim 20, wherein said series circuit is connected in shunt with said first resistance, and wherein said switch means is actuated when said circuit output signal has said first logic level and is deactuated when said circuit output signal has said second logic level.

22. A wave shaping circuit as recited in claim 20, further comprising means for delaying the actuation and deactuation of said switch means for a predetermined period of time following each logic level transition in said circuit output signal.

23. A wave shaping circuit as recited in claim 20, wherein said switch means comprises a fast-acting semiconductor switch.

24. A wave shaping circuit as recited in claim 23, wherein said fast-acting semiconductor switch comprises a CMOS transmission gate.

25. A wave shaping circuit as recited in claim 23, wherein said fast-acting semiconductor switch comprises a field effect transistor.

26. A wave shaping circuit as recited in claim 17, further comprising an initial condition means including:
a source of positive supply potential; a source of negative supply potential; a third resistance coupling said source of positive supply potential to said first capacitance; and, a fourth resistance coupling said source of negative supply potential to said second capacitance.

27. A wave shaping circuit as recited in claim 26, wherein the value of said third resistance is greater than that of said fourth resistance.

28. A wave shaping circuit as recited in claim 17, further comprising an initial condition means including:
an operational amplifier having inverting and noninverting inputs and an output; a source of positive supply potential; means coupling said source of positive supply potential to the inverting input of said operational amplifier; means applying said second signal to the noninverting input of said operational amplifier; a pair of series-connected diodes coupling the inverting input of said operational amplifier to the output thereof, said pair of series-connected diodes being poled to conduct from the inverting input to the output; and, a diode coupling said common circuit point to the output of said operational amplifier, said diode being poled to conduct from said common circuit point to the output.

29. A wave shaping circuit as recited in claim 11, further comprising clamping means including a diode network coupling said first and second capacitances, said diode network being poled to conduct from said first capacitance to said second capacitance to limit the separation between the voltage levels of said second and third signals to the total forward conduction voltage of said diode network.

30. A wave shaping circuit as recited in claim 1, wherein said fourth means includes:
a first differentiating means producing a pulse in response to each first logic level/second logic level transition in said circuit output signal; a second differentiating means providing a pulse in response to each second logic level/first logic level transition in said circuit output signal; first switch means operative to bring the voltage level of said second signal substantially equal to that of said first signal in response to said pulse from said first differentiating means; and, second switch means operative to bring the voltage level of said third signal substantially equal to that of said first signal in response to said pulse from said second differentiating means.

31. A wave shaping circuit as recited in claim 30, wherein said fourth means further includes:
means applying said circuit output signal to said first differentiating means; and, an inverter coupling said circuit output signal to said second differentiating means.

32. A wave shaping circuit as recited in claim 30, wherein said fourth means further includes:
means applying said circuit output signal to said first differentiating means; an operational amplifier configured as a comparator and having inverting and noninverting inputs and an output; means applying said first signal to one of the inverting and noninverting inputs of said operational amplifier; means applying said reference signal to the other of the inverting and noninverting inputs of said operational amplifier; and, means coupling the output of said operational amplifier to said second differentiating means.

33. A wave shaping circuit as recited in claim 1, wherein said third means includes:
an operational amplifier configured as a comparator, said operational amplifier having inverting and noninverting inputs and an output; means applying said first signal to one of the inverting and noninverting inputs of said operational amplifier; and, means applying said reference signal to the other of the inverting and noninverting inputs of said operational amplifier, whereby said circuit output signal appears on the output of said operational amplifier.

34. A wave shaping circuit as recited in claim 1, wherein said first means includes amplifier means having an input and an output and operative to amplify the voltage level of a signal on its input; and, means for coupling the electrical output signal to the input of said amplifier means, whereby said first signal appears on the output of said amplifier means.

* * * * *

UNITED STATES PATENT AND TRADEMARK OFFICE
CERTIFICATE OF CORRECTION

PATENT NO. : 4,335,301
DATED : June 15, 1982
INVENTOR(S) : Roger C. Palmer et al.

It is certified that error appears in the above-identified patent and that said Letters Patent are hereby corrected as shown below:

Abstract, line 3, delete "(U2D1, C2)" and insert --(U2, D1, C2)--;

line 19, delete "top" and insert --to--;

line 28, delete "R 8) and insert --R8)--.

Column 1, line 11, after "prior" insert --art--.

Column 6, line 52, delete "respecitvely" and insert --respectively--.

Column 10, line 16, delete "seriesconnected" and insert --series-connected--.

Column 11, line 57, before "reference" insert --the--.

Column 13, line 13, before "second" insert --the--.

Column 15, line 49, Claim 11, line 13), after "noninverting" insert --input--.

Signed and Sealed this

Fourteenth Day of September 1982

[SEAL]

Attest:

GERALD J. MOSSINGHOFF

Attesting Officer  Commissioner of Patents and Trademarks